(12) United States Patent  
Tarasinski et al.

(10) Patent No.: US 9,030,040 B2  
(45) Date of Patent: May 12, 2015

(54) ELECTRIC CONNECTION SYSTEM

(75) Inventors: Nicolai Tarasinski, Frankenthal (DE); Klaus Hahn, Mannheim (DE)

(73) Assignee: Deere & Company, Moline, IL (US)

( * ) Notice: Subject to any disclaimer, the term of this patent is extended or adjusted under 35 U.S.C. 154(b) by 1570 days.

(21) Appl. No.: 12/601,128

(22) PCT Filed: May 27, 2008

(86) PCT No.: PCT/IB2008/003994  
§ 371 (c)(1),  
(2), (4) Date: Apr. 13, 2011

(87) PCT Pub. No.: WO2009/118585  
PCT Pub. Date: Oct. 1, 2009

(65) Prior Publication Data  
US 2011/0204712 A1    Aug. 25, 2011

(30) Foreign Application Priority Data  
May 24, 2007    (DE) .......................... 10 2007 024 644

(51) Int. Cl.  
*B60L 1/00*     (2006.01)  
*A01B 59/06*    (2006.01)  
*F02D 29/06*    (2006.01)  
(Continued)

(52) U.S. Cl.  
CPC ................. *A01B 59/06* (2013.01); *F02D 29/06* (2013.01); *B60K 6/40* (2013.01); *B60K 6/485* (2013.01)

(58) Field of Classification Search  
CPC .......... A01B 59/00; B60K 6/40; B60K 6/485; F02B 75/06; H02K 7/006; F02D 29/06; Y02T 10/6226

USPC .................. 180/6.28, 65 C; 318/52, 68, 807; 618/721; 414/526; 47/1.3, 58.1, 1.5, 47/1.7; 111/118, 200, 915; 43/112; 405/131

See application file for complete search history.

(56) References Cited

U.S. PATENT DOCUMENTS 4,196,785 A * 4/1980 Downing, Jr. ................ 180/6.28  
5,727,637 A * 3/1998 Kono et al. .................... 172/272  
(Continued)

FOREIGN PATENT DOCUMENTS

DE    10 2004 052 023    10/2004  
DE    10 2005 019 362    11/2006

*Primary Examiner* — Rexford Barnie  
*Assistant Examiner* — Elim Ortiz

(57) ABSTRACT

The invention relates to a device for transmitting electrical energy from an agricultural utility vehicle (10) to an attachment (26) which can be reversibly coupled to the utility vehicle (10). The device comprises at least one power electronics system (38, 74) which is arranged on the utility vehicle side, at least one electrical utility vehicle interface (36) and at least one electrical attachment interface (34). The power electronics system (38, 74) can be supplied with electrical energy which can be generated by a generator (16) of the utility vehicle (10). The power electronics system (38, 74) can be connected electrically to the generator (16) and to the utility vehicle interface (36). The attachment (26) has at least one attachment interface (34) and at least one electrical load (30, 102, 104). An agricultural working function can be carried out with the electrical load (30, 102, 104) of the attachment (26). At least one utility vehicle interface (36) can be coupled to at least one attachment interface (34), and in this way at least some of the electrical energy which is generated by the generator (16) of the utility vehicle (10) can be transmitted to the attachment (26) via the utility vehicle interface (36).

5 Claims, 4 Drawing Sheets

(51) Int. Cl.
*B60K 6/40* (2007.10)
*B60K 6/485* (2007.10)

(56) References Cited

U.S. PATENT DOCUMENTS 6,130,487 A * 10/2000 Bertalan et al. ............... 307/9.1
6,237,278 B1 * 5/2001 Persson et al. ................. 47/1.3
6,671,698 B2 * 12/2003 Pickett et al. ..................... 1/1
7,876,104 B2 * 1/2011 Tarasinski ..................... 324/503
2006/0021675 A1 * 2/2006 Gurosik et al. ............... 144/34.1
2008/0087480 A1 * 4/2008 Tarasinski et al. ........... 180/65.4
2009/0305519 A1 * 12/2009 Tarasinski ....................... 439/35

* cited by examiner

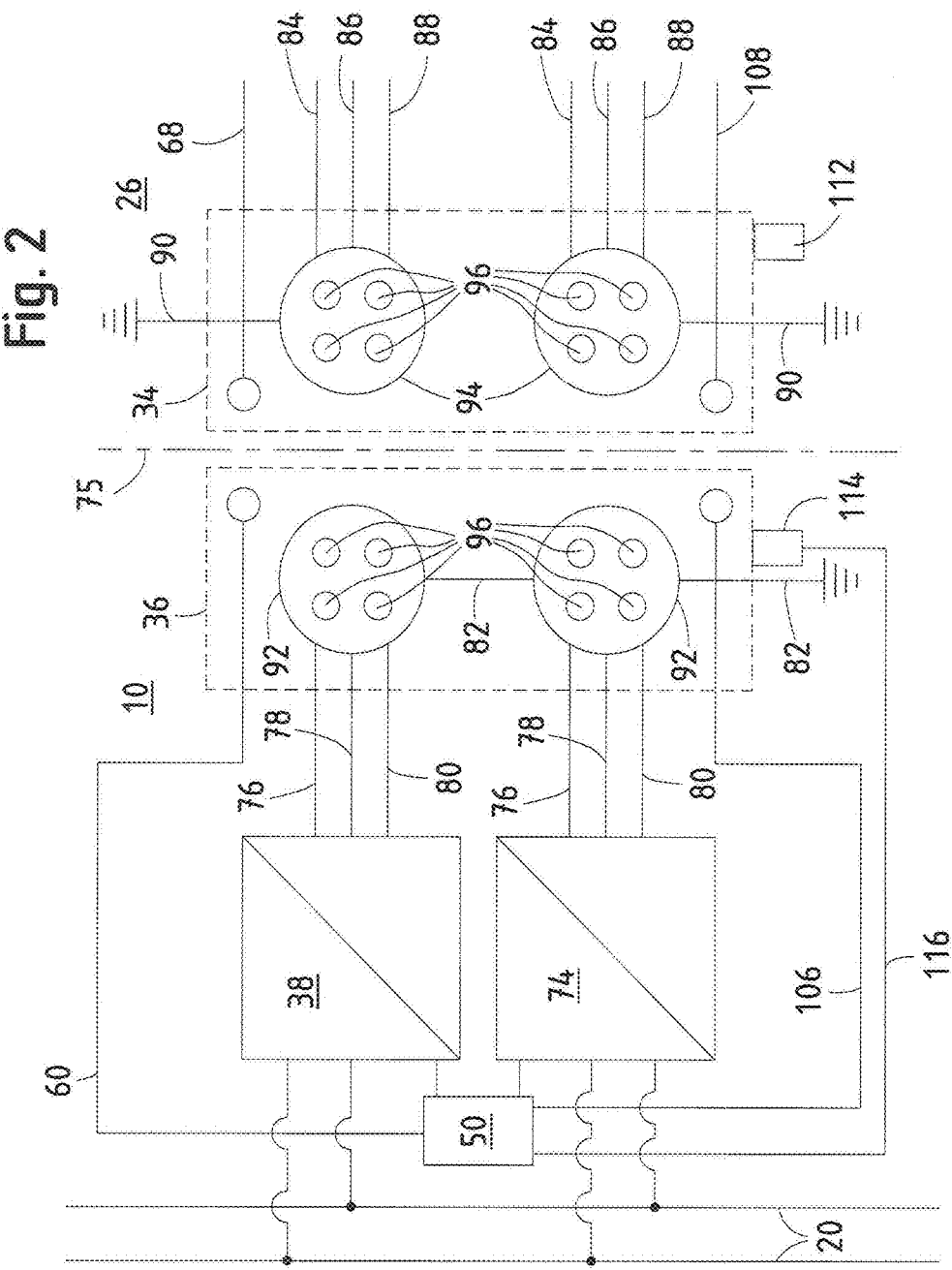

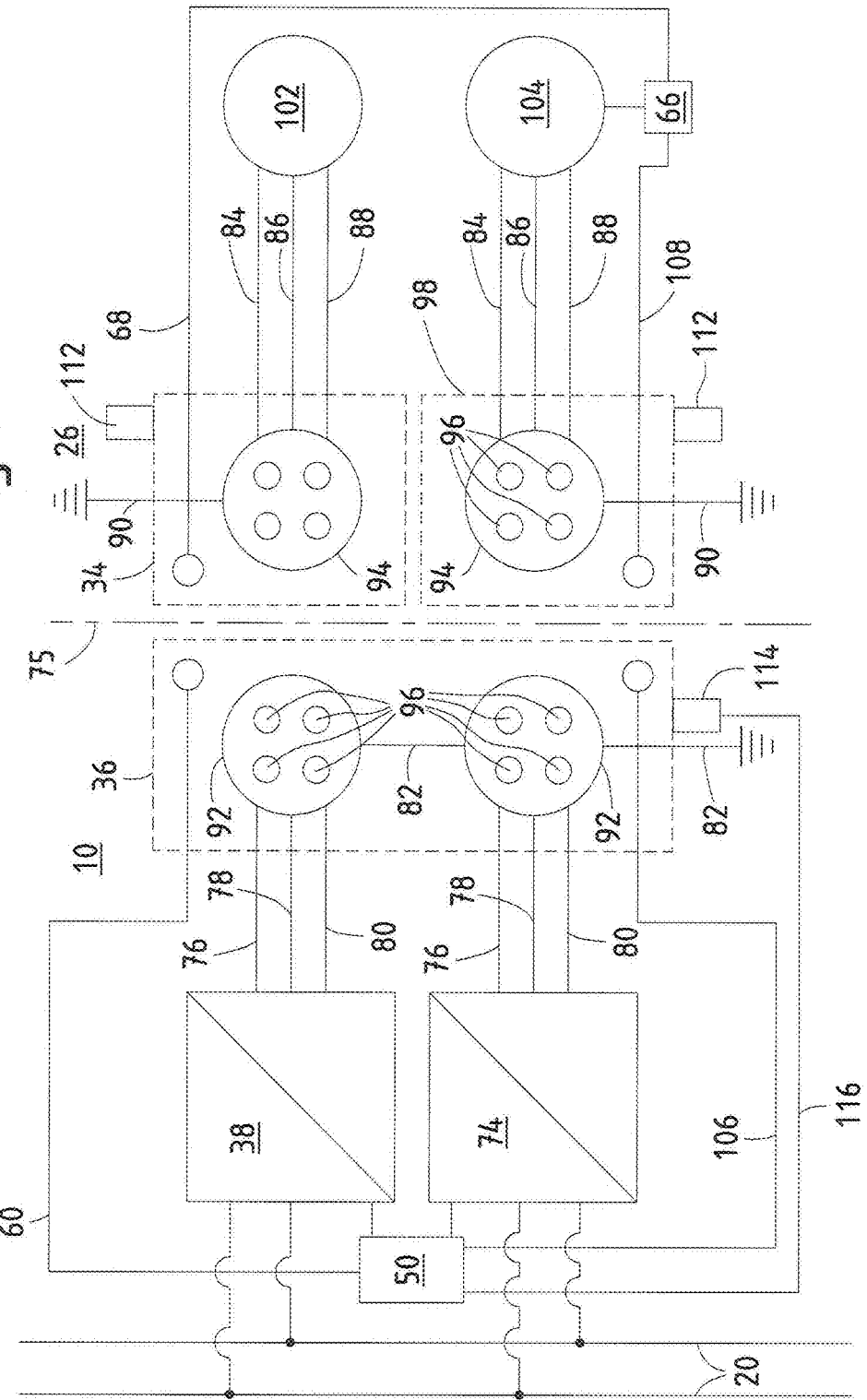

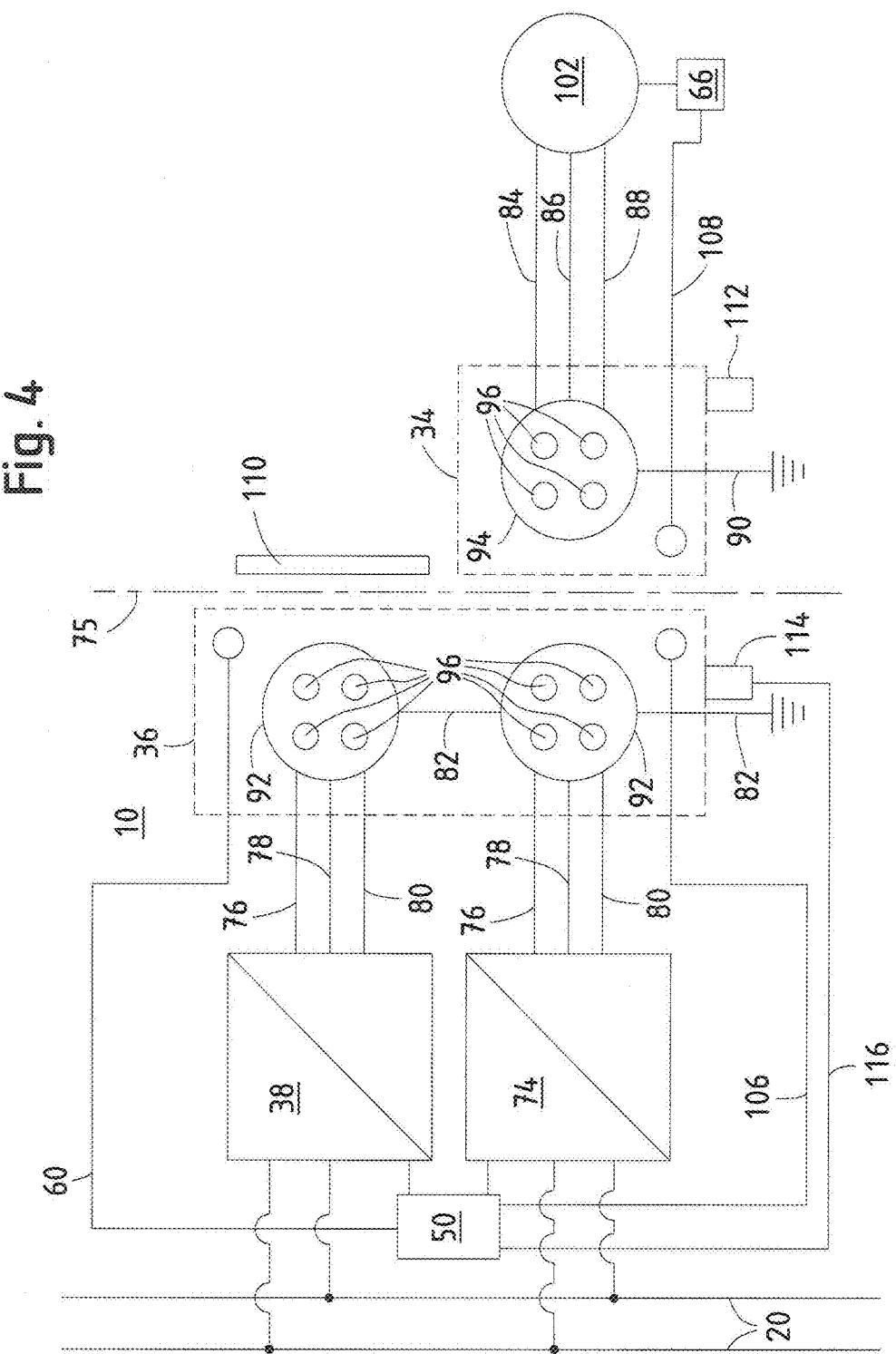

ELECTRIC CONNECTION SYSTEM

BACKGROUND OF THE INVENTION

The present invention relates to a device for transmitting electrical energy from an agricultural utility vehicle to an attachment which can be detachably attached to the utility vehicle.

Agricultural utility vehicles such as, for example field choppers, self-propelling spraying devices and tractors are known from the prior art. A tractor is a versatile utility vehicle since different attachments can be coupled to a tractor. Ploughs, harrows, grubbers, seeders, spraying machines, rotary mowers and round balers are usually coupled. Accordingly a tractor with a respectively coupled attachment carries out a wide variety of agricultural working functions. This makes it also necessary for the tractor to actuate the respective attachment in a corresponding way if the agricultural working function which is carried out with the attachment is carried out with an actuator, a tool or with a motor. But also different harvesting attachments for a combine harvester can constitute an attachment which requires individual actuation by the combine harvester.

Attachments are known whose actuators or tools are driven mechanically, wherein mechanical driving power is transmitted to the attachment from a power take-off shaft provided on the tractor. An example of such an attachment is a round baler. Furthermore, attachments are known which are driven hydraulically. For this purpose, hydraulic quick-release couplings are provided on the tractor and are connected to hoses of the attachment. Such an attachment is, for example, a front loader or a towed spraying machine. In the case of the front loader, the boom is controlled and activated hydraulically. In the case of the pulled spraying machine, the linkage is adjusted hydraulically.

Both the mechanical and the hydraulic transmission of power between the utility vehicle and the attachment entail problems in terms of actuation. It is therefore necessary, inter alia, for the internal combustion engine of the utility vehicle to be operated at a certain rotational speed and/or for the gear mechanism to have a certain, predefined transmission ratio to enable the attachment which is actuated via the power take-off shaft to be operated correctly. This may result in a poor level of efficiency of the tractor-trailer combination composed of the utility vehicle and attachment.

Attachments are known which have electrical loads. These are electric motors and/or fans of relatively low power class. Furthermore, lighting devices and/or solenoids can be operated electrically as actuator drives. Hitherto they have been supplied by the vehicle on-board electrical system of the utility vehicle. Electrical energy which is necessary for this is generated by the conventional dynamo of the utility vehicle. Hitherto, attachments with electrical loads which have a relatively high power consumption for carrying out an agricultural working function have not been used.

EP 1 306 955 A2 discloses a mobile high-voltage power system of a utility vehicle for making available direct voltage with a high power for an attachment. In this context, only direct current is transmitted via the attachment interface of the utility vehicle or of the attachment. However, this entails problems owing to corrosion and formation of light arcs.

WO 2006/114437 A1 discloses an interface device for transmitting electrical energy between a utility vehicle and an attachment which can be coupled to the utility vehicle. The interface device is assigned a measuring device and/or an actuating device. At least one electrical status variable of the transmitted electrical energy is quantified by means of the measuring device. At least one electrical status variable of the transmitted electrical energy is changed by means of the actuating device. Specifically, the voltage and/or the current strength of the transmitted electrical energy is increased or reduced by means of the actuating device, or the interface device is switched to a voltage-free state.

The present invention is based on the object of specifying and developing a device of the type mentioned at the beginning which overcomes the abovementioned problems. In particular, the intention is that the device will permit electricity to be supplied to an attachment which can be coupled to the utility vehicle, in which case the attachment is to be controlled more flexibly or better when it is operating, and the level of efficiency is to be raised.

Thus, the problem to be solved by the present invention is that of providing a device that will permit electricity to be supplied to an attachment for being coupled to an utility vehicle, in which case the attachment is to be controlled more flexibly or better when it is operating, resulting in the level of efficiency being raised.

SUMMARY OF THE INVENTION

According to the present invention, there is provided an improved device for supplying an attachment with electrical power generated by a utility vehicle.

An object of the invention is to provide a device of the type mentioned at the beginning, characterized in that the vehicle includes a power electronics system designed to make available the type of current which is necessary for the electrical load of the respective attachment, and in that at least two different types of current can be made available by the power electronics system.

According to the invention, a concept for electrically supplying the agricultural utility vehicle and/or the attachment is proposed. In this context, the attachment has an electrical load with which an agricultural working function can be carried out. It is to be expected that different attachments have different types of electrical loads which have to be respectively supplied electrically with different types of current and in different power classes by the utility vehicle. For this purpose, the concept according to the invention provides for the electrical energy to be made available or generated by means of the utility vehicle. Furthermore, the utility vehicle has at least one power electronics system by means of which the electrical energy which is generated by the electrical energy source can be converted into the electrical energy which is required by the attachment which is coupled to the utility vehicle at that particular time. As a result, different attachments can advantageously be coupled to the utility vehicle and operated electrically. The attachments themselves can be simpler in terms of design and do not have to be equipped with their own power electronics system components. As a result, redundancy is avoided and costs reduced. The device for transmitting electrical energy is flexible and can be reconfigured if a different attachment is coupled or connected to the utility vehicle. Furthermore, safe and reliable operation is advantageously possible since the power electronics system is a fixed component of the utility vehicle. This results overall in an improved level of efficiency of the tractor-trailer combination composed of an agricultural utility vehicle and an attachment coupled to it, since, for example, there is no need for the rotational speed of the internal combustion engine to be associated in a compulsory fashion with the intended operating mode of the attachment. To this extent, a flexible actuation strategy which is optimized to predefined objectives can be implemented with the electrical supply concept according to the invention. For example, the utility vehicle and the attachment can be actuated or operated in such a way that the fuel consumption of the internal combustion engine is minimized. The tractor-trailer combination can also be actuated in such a way that the working steps which are to be carried out can be implemented in a way which is optimized in terms of time, that is to say as quickly as possible. The power flux of the electrical energy between the utility vehicle and the attachment can be actuated in a flexible way within certain limits using appropriate power electronics systems.

Alternating current, mixed current and/or direct current can be provided as the type of current. Three-phase current or single-phase or multi phase alternating current is possible as the alternating current. In this context, a saw-tooth voltage or square-wave pulses or voltage pulses can also be converted by the power electronics system and made available via the electrical interfaces as the type of current or type of voltage. The square-wave pulses can have predefined or variable pulse widths and/or pulse frequencies and/or pulse intervals.

According to one preferred embodiment, the utility vehicle has a direct voltage intermediate circuit and an active or passive rectifier. The electrical energy which is generated by the generator can be fed to the direct voltage intermediate circuit by means of the rectifier. The at least one power electronics system can be supplied electrically by the direct voltage intermediate circuit. Since the generator is generally driven mechanically by the internal combustion engine of the utility vehicle and is therefore operated with a rotational speed which is dependent on the internal combustion engine, the alternating voltage which is initially generated by the generator also has a frequency which is dependent on the rotational speed of the internal combustion engine. The electrical energy which is generated by the generator is fed into the direct voltage intermediate circuit independently of the rotational speed by means of the rectifier, wherein the power electronics system converts the direct voltage into the type of current required by the attachment and makes it available to the electrical load of the attachment.

The power electronics system particularly preferably has a power converter which can be operated in such a way that at least two different types of current can be converted. For example, the power converter can be actuated in such a way that it supplies a permanently set, standardized voltage or frequency, for example 480 V at 60 Hz to the attachment. If a different attachment is coupled to the utility vehicle, a standardized, fixed square-wave voltage, for example with 400 Hz, can be converted with the same power converter. Basically, the power converter can also make available direct current to the attachment even if this is less preferred, for the abovementioned reasons.

At least two, preferably four, electrical line connections which are assigned to the utility vehicle interface and/or the attachment interface are provided for transmitting the electrical energy. Different types of current can be transmitted via at least one of the line connections. The different types of current are transmitted via these line connections which can be produced by means of corresponding line contacts of the two electrical interfaces. Accordingly, two, three or four line connections can be actively involved in the transmission of current between the utility vehicle and the attachment, depending on which type of current is required by the respective attachment for it to operate.

According to a particularly preferred embodiment, the utility vehicle interface and/or the attachment interface has sets of electrical line contacts which are combined to form at least one plug-type connector. Such a plug-type connector can be embodied in the form of a socket on the utility vehicle side and in the form of a plug on the attachment side. The plug and socket are embodied so as to be essentially complementary to one another. The utility vehicle interface and/or the attachment interface preferably respectively have two plug-type connectors. A plug-type connector preferably comprises a set of four line contacts which can be used as three phases and a neutral conductor for the transmission of power. The set of line contacts of a plug-type connector are electrically connected to the line connections which transmit the electrical current.

The set of electrical line contacts which are combined to form a plug-type connector on the utility vehicle side can be connected electrically to the power electronics system via line connections, in particular if the power electronics system is embodied in the form of a converter. As a result, the power electronics system supplies one of the plug-type connectors with the necessary type of current.

A plug-type connector of the attachment interface can be connected electrically to an electrical load or to a component circuit of the attachment. Accordingly, the electrical load or the one component circuit of the attachment is supplied with electrical current of the necessary type by the power electronics system of the utility vehicle via the plug-type connectors.

According to one particularly preferred embodiment, the utility vehicle has two power electronics systems. The utility vehicle interface has two plug-type connectors. Each power electronics system is respectively connected electrically to a plug-type connector. Accordingly, an electrical load of the attachment can be connected via a plug-type connector (of the utility vehicle and of the attachment) to one of the power electronics systems of the utility vehicle, and a second electrical load of the attachment can be connected via the plug-type connector to the other power electronics system of the utility vehicle. As a result, the two electrical loads can be operated independently of one another, which is advantageous in the case of agricultural attachments with a left-right assignment of agricultural working functions.

The proposed concept permits different operating states during the operation of the utility vehicle or attachment, which operating states are listed below, not conclusively.

For example, a first operating state is provided in which a plug-type connector is activated to transmit power and in which a plug-type connector is deactivated. In this context, just one plug-type connector of the utility vehicle is therefore connected to a plug-type connector of the attachment. The other plug-type connector of the utility vehicle is not connected to any other plug-type connector of the attachment. This operating state is applied, in particular, in an attachment with just one electrical load.

According to a second operating state, two plug-type connectors of the utility vehicle are activated in order to transmit power, wherein the two plug-type connectors are connected electrically to two plug-type connectors of the attachment. This operating state is expedient in particular if two identical or different electrical loads of the attachment have to be supplied. It is then possible for each plug-type connector to respectively have connected to it an electrical load of the attachment with an identical power consumption or with a significantly different power consumption.

In a third operating state, two-plug type connectors of the utility vehicle are activated in order to transmit power. The electrical power which is transmitted via the two plug-type connectors is made available to an electrical load in a parallelized fashion, as a result of which at maximum twice the power which can be transmitted via a plug-type connector can be made available to an electrical load.

In a fourth operating state, the two power electronics systems are operated in such a way that three phases and one neutral conductor, that is to say 4 line connections can be made available to the attachment. For this purpose, the two power electronics systems can be used jointly, wherein the three phases of the three-phase current are made available with one of the power electronics systems and the connected neutral conductor is made available with the other power electronics system.

Since the described operating states can be implemented with the device according to the invention for transmitting electrical energy, a reconfigurable and flexible system for operating at least one attachment to a utility vehicle is advantageously formed.

In order to automate the selection of the operating state which is to be respectively set, at least one means which can be used to determine which operating state is to be set or which type of current is to be made available to the attachment can be provided. Such a means can be embodied in the form of a mechanical component of the attachment interface or of the utility vehicle interface. A sensor can be provided by means of which the mechanical component can be detected. It is therefore possible, for example, in the case of a plug-type connector, to provide preferably zero up to four control pins with which attachment identification information can be encoded and transmitted.

The means particularly preferably has a communications network with which an electrical load or a control device of the attachment can exchange, with a control device of the utility vehicle and/or a control device of the power electronics system, information relating to the selection of the operating state which is to be set or to the type of current which is to be made available. The means can also be part of the communications network. Such a communications network can be based on a CAN bus or an Ethernet data network.

Alternatively or additionally, the means can have a transponder which is provided at the attachment interface. The means has a reading and/or writing device, provided at the utility vehicle interface, for a transponder. As a result, an attachment which is coupled to the utility vehicle can be identified in a contactless fashion or without mechanical encoding means.

According to one particularly preferred embodiment, the utility vehicle interface has two plug-type connectors. There are then different possible ways of connecting plug-type connectors of the attachment interface to the two plug-type connectors of the utility vehicle interface. The most common possibilities are listed.

An attachment interface which has just one plug-type connector can be coupled to the utility vehicle interface. Accordingly, just these connected plug-type connectors are activated. The other plug-type connector of the utility vehicle interface is electrically deactivated and sealed or covered to protect it from external environmental influences.

The attachment electrical interface can be embodied in the form of a double plug and have two plug-type connectors. Accordingly, the two plug-type connectors of the attachment interface are connected electrically to the two plug-type connectors of the utility vehicle electrical interface and are activated while the attachment is operating.

It is also possible to couple two individual attachment electrical interfaces to the utility vehicle electrical interface, in which case each attachment interface has one plug-type connector. In other words, such an attachment interface has one individual plug.

It is also significant that for safety related reasons at least one monitoring means is preferably provided and embodied correspondingly, which monitoring means can be used to monitor at least the states listed below.

It is to be possible to monitor whether an attachment electrical interface is completely or incompletely connected to the utility vehicle electrical interface. If the two interfaces are incompletely connected, the utility vehicle interface is to remain free of voltage.

If the attachment electrical interface is to be disconnected from the utility vehicle interface, a monitoring means of corresponding design is to recognize this and to switch the utility vehicle electrical interface to a voltage free state.

Furthermore, the monitoring means needs to be able to detect whether or not the electrical components are electrically insulated. If it is determined that the electrical components are not insulated or are insufficiently insulated, the driver can be warned and/or the device for transmitting the electrical energy can be switched off.

The monitoring means can be integrated into a communications network and alternatively or additionally integrated into the components of the plug-type connectors or of the utility vehicle interface and/or attachment interface.

A control device is particularly preferably provided with which at least one electrical load of the attachment can be actuated and/or controlled. This control device can be provided on the utility vehicle and can directly take into account measurement variables of the utility vehicle. Such measurement variables can be the velocity of the vehicle over the ground, the rotational speed of the internal combustion engine and/or the current slip of a utility vehicle which is embodied in the form of a tractor. The control device actuates, in particular, the at least one power electronics system of the utility vehicle.

The electrical load of an attachment can therefore be actuated with a predefined and essentially invariable voltage and/or invariable frequency by means of the control device. Customary characteristic values for this are, for example, 400 V, 50 Hz or 480 V, 60 Hz, respectively with or without a neutral conductor, or a square wave voltage with 400 Hz and/or 15 kHz.

The electrical load of an attachment can be actuated and/or controlled with a predefined variable voltage and/or predefined variable frequency from the utility vehicle. By means of such actuation, the electrical load of the attachment can be operated as a function of the velocity of the utility vehicle. In the case of a tractor, this corresponds to an operating mode of a mechanically driven attachment with a rotational speed of the power take-off shaft, a so-called path PTO shaft, which is dependent on the speed of the utility vehicle. Additionally or alternatively, an electrical load of the attachment can be actuated and/or controlled with a predefined variable voltage from the attachment. For example, the attachment can have an operating mode in which the attachment requests the required energy to operate from the utility vehicle.

A communications network can be provided for transmitting data, by means of which communications network a control device of the attachment can be identified and/or actuated. Such a communications network can be used, inter alia, to configure a power electronics system or a power converter of the utility vehicle. Data which is used to actuate or control the at least one electrical load of the attachment can also be transmitted via such a communications network. Such a communications network can have a CAN bus or an Ethernet, in particular a real-time-capable Ethernet data network.

To permit the highest possible level of efficiency of the utility vehicle and/or of the attachment to be achieved, it is possible to provide a control loop which has the power electronics system of the utility vehicle and/or a control device.

The control loop can communicate with sensors and/or controllers of the utility vehicle and/or of the attachment and have a communications network for transmitting data. By means of this control loop it is possible, for example, to control the abovementioned pulse width and/or pulse frequency and/or amplitude of a square wave voltage. It is therefore possible, for example, to provide that the control device of the utility vehicle communicates directly with sensors of the attachment via the communications network and actuates the power electronics system of the utility vehicle as a function of the variables detected by the respective sensors, in such a way that the electrical loads of the attachment are supplied directly with electrical energy without a further control device being provided on the attachment.

The network can have a CAN bus and/or an Ethernet data network, for example a real time Ethernet data network. Since a higher data transmission rate is possible with an Ethernet data network, and in particular a real time Ethernet data network, than with a CAN bus, a network which is based on an Ethernet data network is preferably used.

Specifically, the utility vehicle has an attachment interface with which an attachment can be detachably coupled to the utility vehicle. This may involve a conventional three-point equipment attachment, an adjustable drawbar or some other mechanical coupling which is customary in the case of agricultural utility vehicles and/or attachments, and in particular in the case of tractors.

According to one preferred embodiment of the present invention, an agricultural utility vehicle has a device for transmitting electrical energy from the utility vehicle to an attachment which can be coupled to the utility vehicle. The utility vehicle comprises a generator, at least one utility vehicle electrical interface and at least one power electronics system. Electrical energy can be generated by means of the generator. The power electronics system is connected electrically to the generator and to the utility vehicle interface. The attachment has at least one attachment electrical interface and one electrical load. An agricultural working function can be carried out by means of the electrical load of the attachment. At least one utility vehicle interface can be coupled to at least one attachment interface and in this way at least some of the electrical energy which is generated by the generator of the utility vehicle can be transmitted to the attachment. The power electronics system is designed to make available the type of current which is necessary for the electrical load of the respective attachment. At least two different types of current can be made available by the power electronics system. In other words, the agricultural utility vehicle which is defined according to this embodiment is provided with the necessary electrical components which are necessary to operate different attachments by means of at least one electrical load in order to carry out at least one agricultural working function. In particular, this utility vehicle makes available the necessary electrical infrastructure and at least one utility vehicle interface to which an attachment interface of the attachment can be connected.

According to one preferred embodiment of the present invention, an agricultural attachment comprises a device for transmitting electrical energy from an agricultural utility vehicle to the attachment which can be coupled to the utility vehicle. The attachment has at least one attachment electrical interface and at least one electrical load. An agricultural working function can be carried out by means of the at least one electrical load. At least one utility vehicle interface of the utility vehicle can be coupled to the at least one attachment interface and in this way at least some of the electrical energy which is generated by the generator of the utility vehicle can be transmitted to the attachment. The utility vehicle has at least one power electronics system which is designed to make available the type of current which is necessary for the electrical load of the respective attachment. At least two different types of current can be made available by the power electronics system. The agricultural attachment which is defined according to this embodiment is therefore designed to be coupled to the embodiment of the agricultural utility vehicle described above. After the attachment interface has been coupled to the utility vehicle interface, the attachment can be supplied with electrical energy which is made available by the utility vehicle in the type of current which is required for the attachment.

There are then various possible ways of advantageously refining and developing the teaching of the present invention.

The foregoing and other objects of the invention will be apparent from a reading of the ensuing description together with the appended drawings.

BRIEF DESCRIPTION OF THE DRAWINGS

FIGS. 2 to 4 are schematic representations respectively showing the electrical interface of the vehicle coupled to three different electrical interfaces of the attachment.

DESCRIPTION OF THE PREFERRED EMBODIMENT

Figure 1:
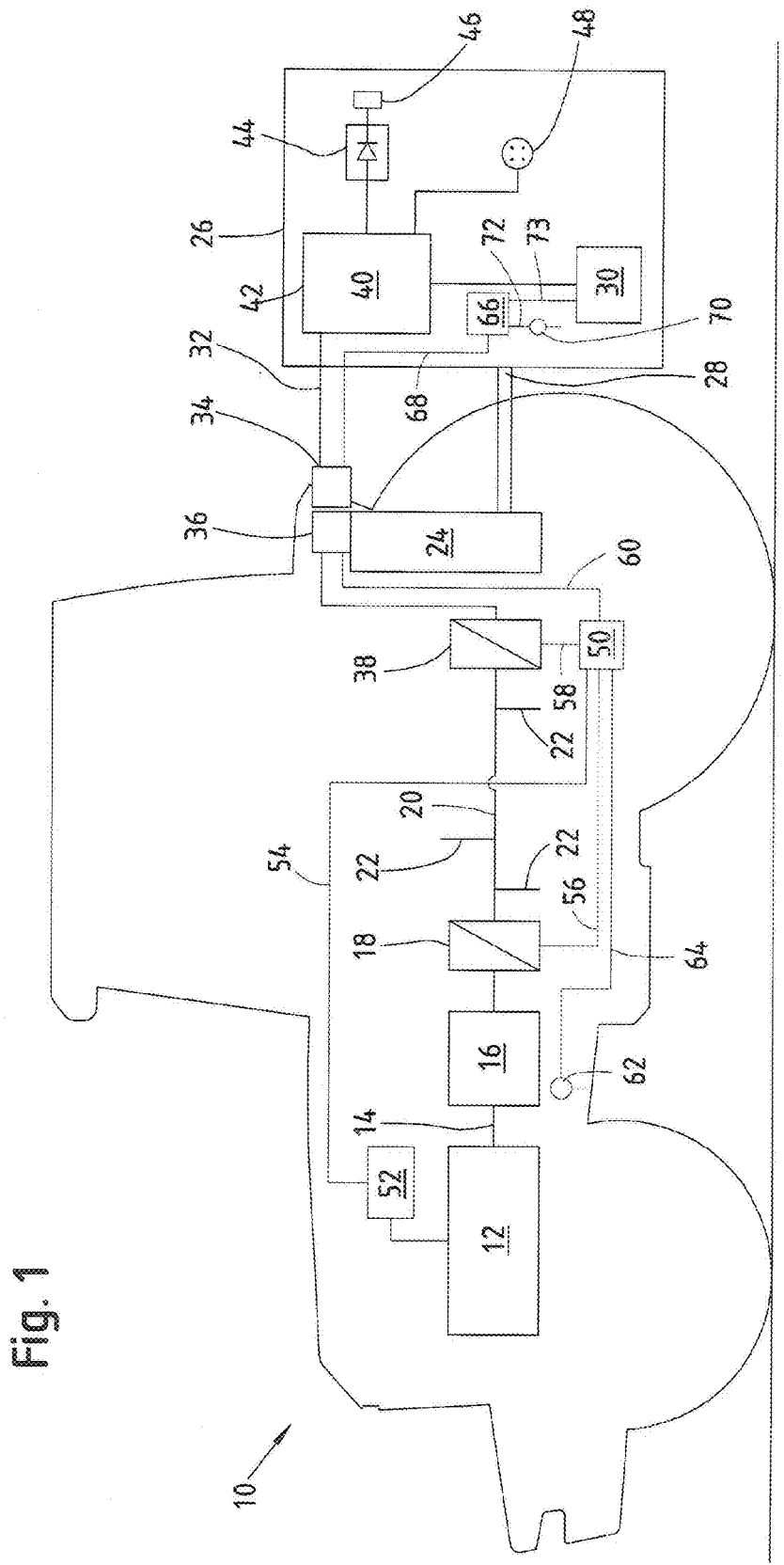
FIG. 1 is a schematic left side view of a device constructed in accordance with the principles of the present invention for transmitting electrical energy from an agricultural utility vehicle to an attachment which is coupled to the utility vehicle.

Identical or similar components are identified with the same reference symbols in the figures.

FIG. 1 shows an agricultural utility vehicle 10 which is embodied in the form of a tractor. In the text which follows, the tractor is also denoted by the reference symbol 10. The tractor 10 has an internal combustion engine 12. On the one hand, the locomotive drive for the tractor 10 is driven via a gear mechanism (not shown in FIG. 1) by the output shaft 14 of the internal combustion engine 12. On the other hand, the output shaft 14 drives the generator 16. The generator 16 is permanently installed on the tractor 10. Specifically, the generator 16 is embodied in the form of a crankshaft generator and is attached by its stator to the motor housing and by its rotor to the flywheel of the internal combustion engine 12. The generator 16 generates 3-phase alternating current which is converted into direct current by means of the power converter 18 of the generator 16 and a rectifier contained therein. The direct current is fed into the direct voltage intermediate circuit 20 of the tractor 10. The voltage of the direct current intermediate circuit 20 is approximately 700 V. It is only indicated schematically that further electrical loads (not shown in FIG. 1) are supplied via the branches 22 of the direct voltage intermediate circuit 20.

The tractor 10 has a mechanical attachment interface 24 which can be embodied in the form of a three-point equipment attachment, an adjustable drawbar and/or some other common coupling system. The attachment 26 is coupled via the mechanical connection 28 to the attachment interface 24 of the tractor 10. The attachment 26 has, inter alia, an agricultural working function which is carried out or driven with an electric motor 30. The electric motor 30 of the attachment 26 is supplied with electrical energy by the electrical supply system of the tractor 10. For this purpose, the attachment 26 is connected to an utility vehicle electrical interface 36 of the tractor 10 via the electrical line 32 and an attachment electrical interface 34 of the attachment 26. The utility vehicle interface 36 is in turn connected electrically to the power electronics system which is embodied in the form of a power converter 38. The power converter 38 converts the direct current of the direct voltage intermediate circuit 20 into alternating current. The alternating voltage is in a range of from approximately 400 V to 480 V. The alternating current which is converted by the power converter 38 is fed to the transformer 40 via the line 32. Accordingly, an alternating voltage of 400 V to 480 V is applied to the primary side of the transformer 40. The transformer 40 is provided on the attachment 26 and is permanently mounted there in a housing 42. To this extent, the transformer 40 and the housing 42 constitute one structural unit.

The transformer 40 converts the primary-side alternating voltage of 400 V to 480 V into a secondary-side alternating voltage of 200 V to 240 V. The electric motor 30 and ultimately the agricultural working function are therefore driven with this alternating voltage. A rectifier 44 is connected to the transformer 40, said rectifier 44 generating direct voltage from the secondary-side alternating voltage and making it available via a socket 46 to an electrical load which can be adapted to the attachment 26 (said electrical load not being shown since it is not adapted to the attachment 26). Furthermore, a three-phase socket 48 is provided by means of which it is possible to connect an electrical load (not shown in FIG. 1) which is operated with three-phase current. To this extent, the attachment 26 has an electrical distributor system by means of which electrical current can be made available to other electrical loads, inter alia to the electric motor 30 which is permanently installed on the attachment 26.

The utility vehicle 10 comprises a control device 50 with which the power converters 18 and 38 can be actuated. The control unit 52 of the internal combustion engine 12 actuates the internal combustion engine 12 as a function of operator control inputs and is connected to the control device 50 via the data line 54 of the communications network. In the same way, the power converters 18, 38 are connected to the control device 50 via the data lines 56, 58. The data line 60 connects the control device 50 to the utility vehicle interface 36. The velocity sensor 62 is connected to the control device 50 via the data line 64. The attachment 26 comprises a control device 66 which is connected to the attachment interface 34 via the data line 68. An attachment-specific measurement variable can be detected by means of the sensor 70 of the attachment 26. The sensor 70 is connected to the control device 66 via the data line 72. The electric motor 30 is connected to the control unit 66 via the data line 73. The data lines 60, 68 between the control devices 50, 66 and the further data lines 54, 56, 58, 64, 72 which connect the respective components to the control device 50, 66 form the communications network of the tractor-trailer combination composed of the utility vehicle 10 and attachment 26. In particular the control unit 52 can transmit the instantaneous rotational speed of the internal combustion engine 12 to the control device 50 via the data line 54. Furthermore, the velocity of the vehicle which is determined by the velocity sensor 62 is transmitted via the data line 64 of the control device 50. The attachment-specific measurement variable which is determined by the sensor 70 and the current operating state of the electric motor 30 are transmitted to the control device 66 of the attachment 26 via the data lines 72 and 73, respectively. The control device 66 is connected via the data lines 60, 68 to the control device 50 by means of which the measurement and control variables which are necessary to actuate the electric motor 30 of the attachment 26 are exchanged.

Information from the electric motor 30 and the control device 66 of the attachment 26 can be exchanged with the control device 50 of the utility vehicle 10 via the communications network. To this extent, it is possible to identify the attachment 26 directly on the basis of the exchanged data as soon as the attachment interface 34 is connected to the utility vehicle interface 36. A control loop which exchanges measurement data and control data between the control device 50 of the utility vehicle 10 in order to actuate the power converter 38, and further sensors 62, 70 and controllers 52 of the attachment 26 and of the utility vehicle 10, is also provided. The communications network is based on an Ethernet data network, specifically on a real-time-capable Ethernet derivate.

FIGS. 2 to 4 each show the electrical interface 36 of the utility vehicle 10 from FIG. 1, which utility vehicle interface 36 is connected to two power electronics systems of the utility vehicle 10. FIGS. 2 to 4 do not show all the components of the utility vehicle 10 from FIG. 1. The dividing line 75 indicates which components are associated with the utility vehicle 10 (shown on the left-hand side) and which components are associated with the attachment 26 (shown on the right-hand side). One of the power electronics systems is the power converter 38, and the other power electronics system is the power converter 74. The two power converters 38, 74 are connected electrically in parallel to the direct voltage intermediate circuit 20 and are supplied with direct voltage by the direct voltage intermediate circuit 20. The two power converters 38, 74 are actuated by the control device 50.

Four electrical line connections are provided for transmitting the electrical energy generated by the generator 16 to an attachment, both at the utility vehicle interface 36 and at an attachment interface 34. On the utility vehicle side, these are the line connections 76 to 82. On the attachment side they are the line connections 84 to 90. The line connections 82, 90 have the function of a neutral conductor. The line connections 76 to 80 and 84 to 88 are used for transmitting electrical energy between the utility vehicle 10 and the attachment 26. The line connections 76 to 82 are each combined on the utility vehicle side to form a plug-type connector 92. On the attachment side, the line connections 84 to 90 are each combined to form a plug-type connector 94. The two plug-type connectors 92 are embodied in the form of a socket and are arranged in a housing of the utility vehicle interface 36. One of the plug-type connectors 92 is directly connected electrically to the power converter 38. The other plug-type connector 92 is directly connected electrically to the power converter 74.

The two plug-type connectors 94 of the attachment interface 34 from FIG. 2 are embodied in the form of a plug which is complementary to the socket or plug-type connectors 92. The line connections 84 to 88 of each plug-type connector 94 are each electrically connected on the attachment side to an electrical load (not shown in FIG. 2) of the attachment 26. The four line contacts 96 of each plug-type connector 92 and 94 are respectively electrically connected to the line connections 76 to 82 and 84 to 90 and ultimately bring about the electrical contact between the plug-type connectors 92 and 94 and the corresponding line connections as soon as the utility vehicle interface 36 is coupled electrically to the attachment interface 34. In the exemplary embodiment according to FIG. 2, the two plug-type connectors 92 of the utility vehicle 10 are connected electrically to the two plug-type connectors 94 of the attachment 26, and both plug-type connections are therefore activated.

FIG. 3 shows an exemplary embodiment which is comparable to that in FIG. 2 insofar as the utility vehicle 10 side is concerned. On the attachment side, two attachment interfaces 34, 98 are provided, and said attachment interfaces 34, 98 are connected jointly to the utility vehicle interface 36. The attachment interface 34 and its plug-type connector 94 is connected to an electrical load 102 which is embodied in the form of an electric motor. The attachment interface 98 and its plug-type connector 94 is connected to another electrical load 104 which is also embodied in the form of an electric motor. The electrical load 102 is therefore actuated by the power converter 38 via the electrical interfaces 34, 36 and supplied with electrical energy. The electrical load 104 is actuated by the power converter 74 via the electrical interfaces 36, 98 and supplied with electrical energy, specifically independently of the instantaneous electrical supply of the electrical load 102 by the power converter 38.

FIG. 4 shows an exemplary embodiment which is comparable to that in FIG. 3. However, on the attachment side just one attachment electrical interface 34 is provided. A further attachment electrical interface is not coupled to the utility vehicle electrical interface 36. Accordingly, just the plug-type connectors 92, 94 are coupled to one another electrically and are active. The plug-type connector 94 is connected to the electrical load 102 which is therefore actuated by the power converter 74 and supplied with electrical energy. The upper plug-type connector 92—not connected to any attachment interface—of the utility vehicle interface 36 is protected against external environmental influences by a covering flap 110.

In FIGS. 2 to 4, the data lines 60, 106 connect the control device 50 to the utility vehicle interface 36. In this context, the data line 60 is assigned to the upper plug-type connector 92, and the data line 106 is assigned to the lower plug-type connector 92 of the utility vehicle interface 36, also with respect to the actuation logic and the evaluation logic. In FIGS. 2 and 3, the data lines 68, 108 connect the attachment interface 34 to the control device 66 (not shown in FIG. 2). In particular, the data lines 60, 106 and 68, 108, respectively, serve to set up the communications network between the utility vehicle 10 and the attachment 26. It is apparent in particular from FIG. 4 that the coupling of the attachment interface 34 to the utility vehicle interface 36 only connects the data lines 106, 108 to one another. Accordingly, the data connection can be set up between the two control devices 50, 66 by just the data lines 106, 108. Depending on the identification of the control device 66 at the control device 50, only the lower plug-type connector 92 which is assigned to the data line 106 is activated. Since no corresponding utility-vehicle-side data line is connected to the data line 60 which is assigned to the upper plug-type connector 92 of the utility vehicle interface 36, the upper plug-type connector 92 is deactivated and therefore switched to a voltage-free state.

Transponder or RFID tags (radio frequency identification tags) are identified by the reference symbols 112 on the attachment interfaces 34 from FIGS. 2 to 4. These transponders 112 can be read out and/or written to in a contactless fashion and at a distance of up to 30 cm (depending on the type of transponders used) by means of the reading and/or writing device 114. In a transponder 112, attachment-specific data which contain operating parameters and further information relating to the operation of the attachment 26 are stored. The reading and/or writing device 114 is connected to the control device 50 via the data line 116. As soon as an attachment interface 34 which is provided with a transponder 112 approaches the utility vehicle interface 36, this is detected by the reading and/or writing device 114 and transmitted to the control device 50 via the data line 116. An actuation logic according to which the utility vehicle interface 36 is switched to a voltage-free state if a transponder is not detected by the reading and/or writing device 114 is based on this information. If the reading and/or writing device 114 detects a transponder 112 but a data connection 60, 68 and/or 106, 108 cannot be detected between the two control devices 50, 66, the utility vehicle interface 36 and the corresponding plug-type connector 92 are also switched to the voltage-free state. Only if the reading and/or writing device 114 detects at least one transponder and a corresponding data line connection is also detected for each of the attachment-side plug-type connectors provided is current for transmitting electrical energy between the utility vehicle 10 and the attachment 26 applied to the plug-type connectors which are connected to one another. This forms a monitoring means with which it is possible to detect whether the two interfaces 34, 36 are effectively connected to one another electrically.

In conclusion it is to be noted that the exemplary embodiments which are mentioned above serve only to describe the claimed teaching but do not constitute a restriction to the exemplary embodiments.

The invention claimed is:

1. In combination with an agricultural utility vehicle having an attachment detachably coupled thereto, with the vehicle including an electric power generator and the attachment including an electrically operated device for performing an agricultural working function, an arrangement for transmitting electrical energy from the generator to the electrically operated device, comprising: at least a first electrical interface carried by the vehicle and a second electrical interface carried by the attachment and coupled to said first electrical interface; at least a first power electronics system being coupled for receiving electrical current from said generator and coupled for delivering electrical current to said first electrical interface; said first power electronics system being operable for making at least two different types of current available to said first electrical interface, with one of said two different types of current being that which is necessary for operating the electrically operated device; a sensor arrangement for obtaining attachment-specific data and using this data for determining which operating state is to be set and which type of current is to be made available to the first electrical interface for powering the attachment, wherein said sensor arrangement includes a transponder containing information pertaining to said electrically operated device mounted on said second electrical interface and a transponder reading and/or writing device mounted on said first electrical interface and operable for reading said information contained in said transponder when said first and second interfaces are at a predetermined distance apart as they approach each other during coupling the attachment to the vehicle; and a control device being electrically coupled to said reading and/or writing device and to said power electronics system and operable for sending a signal to said power electronics system for controlling the power electronics system for supplying said one current of the type for operating said electrically operated device once said first and second electrical interfaces are interconnected.

2. The combination, as defined in claim 1, wherein said utility vehicle includes two power electronic systems and two plug-type connectors, with said two power electronic systems being respectively electrically coupled to said two plug-type connectors.

3. The combination, as defined in claim 1, wherein said first electrical interface includes first and second sets of electrical line contacts which are combined to respectively form first and second plug-type connectors.

4. The combination, as defined in claim 3, wherein said second electrical interface includes a third set of electrical contacts respectively defining a third plug-type connector which is electrically connect to one of said at least two plug-type connectors of said first electrical interface of said utility vehicle, to thereby effect an operating state activating said one of said at least two plug-type connectors; and a second of said at least two plug-type connectors remaining free of being connected to said second interface and being deactivated.

5. The combination, as defined in claim 3, wherein said second electrical interface includes a third set of electrical contacts defining a third plug-type connector, and including a fourth set of electrical contacts defining a fourth plug-type connector, with said third and fourth plug-type connectors being respectively coupled to said at least two plug-type connectors, to thereby effect an operating state activating said at least two plug-type connectors.

* * * * *